(12) United States Patent
Oh-Yang et al.

(10) Patent No.: US 6,351,820 B1
(45) Date of Patent: Feb. 26, 2002

(54) PC CARD WITH AUTOMATED DRAG AND SLEEP FUNCTION

(75) Inventors: Eric Oh-Yang; Richard Chen, both of Hsin-Chu (TW)

(73) Assignee: Abocom Systems, Inc., Hsin-Chu (TW)

( * ) Notice: Subject to any disclaimer, the term of this patent is extended or adjusted under 35 U.S.C. 154(b) by 0 days.

(21) Appl. No.: 09/298,614

(22) Filed: Apr. 26, 1999

(51) Int. Cl.[7] .............................. G06F 1/26; G06F 1/28; G06F 1/30
(52) U.S. Cl. ........................ 713/323; 713/320; 710/301
(58) Field of Search ................. 713/300–340; 710/301–302

(56) References Cited

U.S. PATENT DOCUMENTS

| | | | | |
|---|---|---|---|---|
| 5,442,794 A | * | 8/1995 | Wisor et al. ................ | 713/340 |
| 5,845,136 A | * | 12/1998 | Babcock ...................... | 713/300 |
| 6,052,792 A | * | 4/2000 | Mensch, Jr. ................. | 713/322 |

* cited by examiner

*Primary Examiner*—Rupal Dharia
(74) *Attorney, Agent, or Firm*—Rosenberg, Klein & Lee

(57) ABSTRACT

A PC card having automated Drag and Sleep function is equipped with Drag and Sleep control circuit to connect to the controller of the PC card, a connector unit and the other devices. As the connection of the connector unit to the external system (the external networks or devices) is cut off, the Drag and Sleep control circuit generates and transmits interrupt-signal to the controller to enable the PC card to get into sleep state; when the disconnected connector unit is once again connected to the external system (such as the external networks or devices), the Drag and Sleep control circuit generates and transmits interrupt-signal to the controller to enable the PC card to resume normal state, thus the PC card can effectively save energy because it can greatly lower the electric current consumption under the sleep state.

3 Claims, 4 Drawing Sheets

PC CARD WITH AUTOMATED DRAG AND SLEEP FUNCTION

FIELD OF INVENTION

The present invention relates to a PC card with Drag and Sleep (DnS) function, especially, to the kind of PC cards that perform the function of automated Drag and Sleep according to the connecting status between a connector unit and external system (external networks and/or devices).

BACKGROUND OF THE INVENTION

The performance of portable computers has been greatly upgraded due to the progress of PC-card technology. For example, the functions provided by network card, modem, facsimile machine and many other interface cards can be realized by applying PC cards to portable computers. This kind of development is particularly beneficial to the note-book computers.

However, the power problem of portable computers is always the difficulty to be overcome. Since the battery technology nowadays is not good enough to well fit the power requirements of portable computers, energy saving becomes a significant issue in developing portable computers.

In the prior arts, certain amount of energy will be consumed as long as the PC card is inserted into computer equipment. For instance, when computer users, having the equipment carried with them, and are away from the external system such as the telecommunication or local area networks, devices etc., and are also on their way to other areas, or in the case that users are accustomed to keep the PC card inserted in their note-book personal computer in order to be ready for on-line operation at any time, the PC card will continue to consume energy as if it is in normal operation. This is a big disadvantage, which leads to the needs of carrying back-up batteries and changing batteries very often by users, for those computer equipment using battery because the battery can not maintain its power supply to the computer equipment in a sufficient duration of time due to their limited service life. The only way to avoid this kind of problem in the past is to remove the PC card, i.e. to disconnect it from the power source, but this will bring about another drawback that the PC card needs to be reinstalled and to be set up all over again, and this is what most of the users are reluctant to do since it not only wastes time and consumes energy but also causes inconvenience for the users, especially for those users who are accustomed to keep the PC card inserted in their notebook personal computer so that they can get ready for on-line operation all the time.

SUMMARY OF THE INVENTION

The present invention is to present a PC card having the automated drag and sleep function which makes use of the Drag & Sleep Control Circuit and a connector unit to enable the PC card to get into sleeping state.

Therefore, the main objective of the present invention is to present a PC card having the automated drag and sleep function provided by a Drag and Sleep Control Circuit and equipped therein to detect the connecting status between the PC card and the external system (comprising computer networks or telecommunication networks or devices). When the connection is disabled, the PC card will get into sleeping state, thereby, it can lower the consumed energy and attain the object of energy saving.

Another objective of the present invention is to provide a PC card which is convenient for the use of portable computers. The PC card is equipped with a connector unit, which comprises a plug and a socket and is manually controllable to connect and disconnect between the PC card and the external system, supporting the DnS function and a signal is generated and transmitted in response to the disconnection of the link between the PC card and the external system to enable the PC card's sleeping state. And as the connector unit is once again connected to the external system (external networks or devices), another signal is generated and transmitted to resume the PC-card's normal operation, thereby, the portable computer can work without the needs of cutting off and then putting on connection as well as setting up the PC card all over.

To sum up, the present invention is characterized by installing a Drag & Sleep Control Circuit connected to the PC card's controller and the other devices, as well as utilizing a connector unit supporting the DnS function to connect the Drag & Sleep Control Circuit; when the connector unit is disconnected from the external system (the external networks or devices), the Drag & Sleep Control Circuit will generate and transmit an interrupt signal to the controller to make the PC card get into sleeping state; as the disconnected connector unit is reconnected to the external system (the external networks or devices), the Drag & Sleep Control Circuit will generate and transmit an interrupt signal to the controller so as to make the PC card restore to the state of normal operation, while the PC card retains only the necessary internal devices under the sleeping state to remain idle condition, thereby, it can greatly lower the energy consumption to attain the object of energy saving.

What is more, since the PC card is not completely turned off as it is disconnected from the external system (such as the external telecommunication networks), once we intend to reconnect to the external system (the external networks or devices), all we have to do is to have the connector unit connected and neither do we need to remove the plug from the PC card, nor do we need to reinstall and reset the computer, therefore, it is very convenient when it comes to using the notebook computer, particularly, it is very handy for those users who are accustomed to keep the PC card inserted in the notebook computer so that they can be ready for on-line operation all the time.

In order to disclose the objects, features and efficacy of the present invention, the inventor herewith presents a detailed and clear illustration together with the accompanied drawings as follows:

DETAILED DESCRIPTION OF THE INVENTION

Presented herewith is a high speed Ethernet PC card having the automated Drag & Sleep function as a typical example to disclose the spirit and features of the present invention to enable those who are versed in the art to understand and implement the invention. However, this embodiment is only a specific application, and any kinds of modification or improvement are obvious for those who are versed in the art, moreover, the technical means disclosed by the present invention can be applied to the other embodiments or use without deviating off the spirit of the present invention, thereby, the present invention is in no way limited to the the following embodiments and shall be construed to be of the broast scope so as to encompass every kind of modifications.

Figure 1:
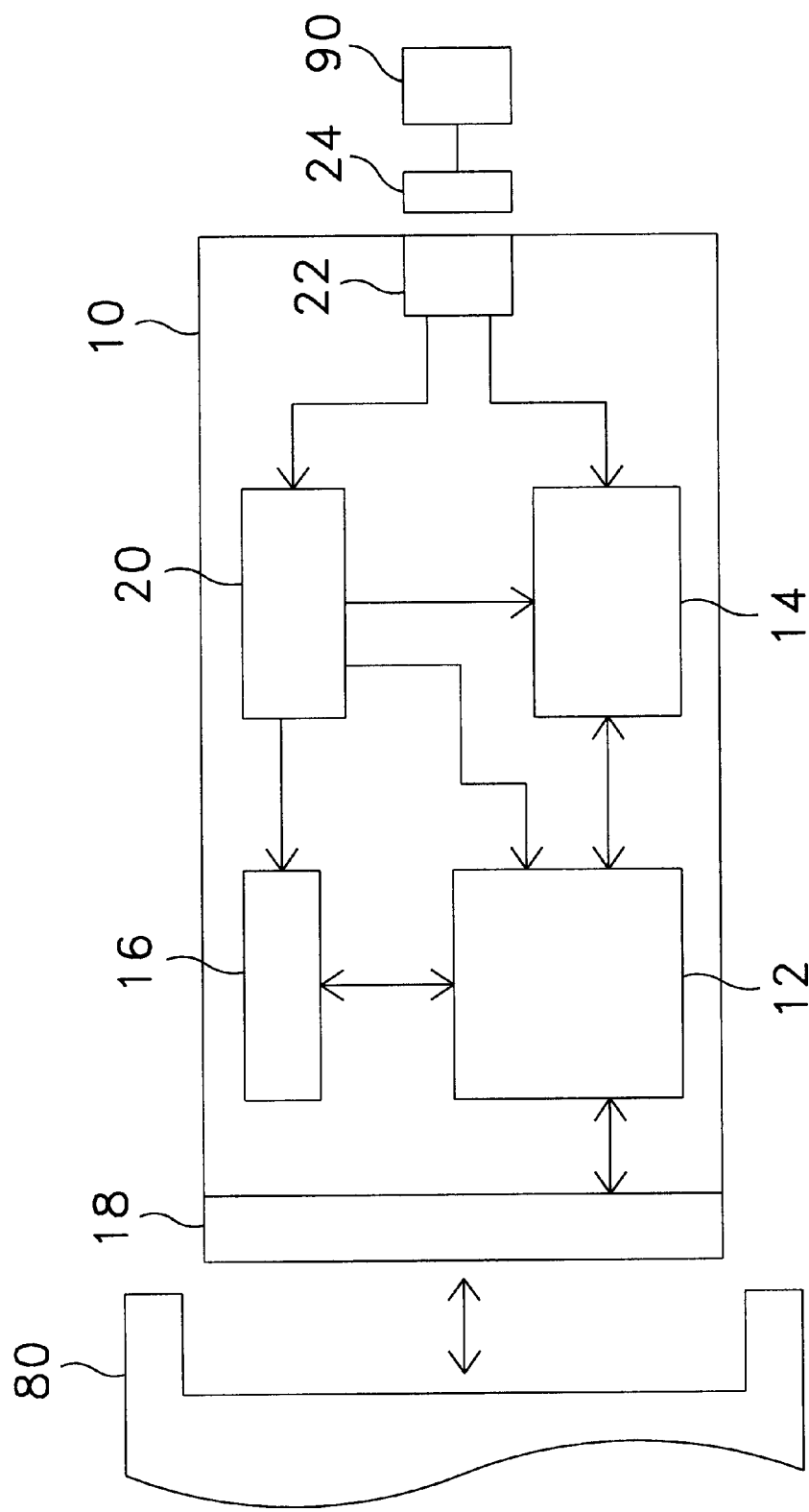
FIG. 1 shows a preferred embodiment of the present invention.

Firstly, referring to FIG. 1, a high speed Ethernet PC card 10 comprises a high speed Ethernet controller 12, an auxiliary unit (which further comprises an unshielded twisted pair wiring transceiver 14 of high speed Ethernet, and a high speed static memory 16), as well as a standard PC card interface 18, wherein the high speed Ethernet controller 12 is connected to the auxiliary unit (the unshielded twisted pair wiring transceiver 14 of high speed Ethernet, and high speed static memory 16) and standard PC card interface 18 respectively. The function of the high speed Ethernet controller 12 is mainly to control the operation of the whole set of the high speed Ethernet PC card 10 to perform data input/output by means of the transceiving operation of the unshielded twisted pair wiring transceiver 14 of high speed Ethernet and to communicate with the other systems or devices through the networks, while the high speed static memory 16 is to work with the high speed Ethernet controller 12 for achieving the function which the high speed Ethernet PC card 10 is expected to provide the stored program code or data therein. Moreover, the high speed Ethernet PC card 10 is plugged in a computer 80 (not completely shown) such as a notebook computer, and is connected to the system of the computer 80 by means of the standard PC card interface 18.

In order to make the high speed Ethernet PC card 10 provide the function of Drag & Sleep (DnS), a Drag & Sleep control circuit 20 is used and connected to the high speed Ethernet controller 12, the auxiliary unit (the unshielded twisted pair wiring transceiver 14, and the high speed static memory 16), and the socket 22 (of the connector unit) which supports the DnS function, among them, the unshielded twisted pair wiring transceiver 14 also connects the socket 22 which supports the DnS function. Linking with external networks is achieved through the connection between socket 22 and plug 24 of the connector unit supporting the DnS function, and the RJ45 unshielded twisted pair wiring connector unit head 90; the function of Drag & sleep is triggered by the Drag & sleep controller 20 which switches the high speed Ethernet PC card 10 between Drag & Sleep state or normal operating state in accordance with the link condition between the connector unit (the socket 22 and plug 24 which support DnS function) and the external system (such as external networks). More detailed illustration is disclosed hereafter.

The operation of the high speed Ethernet PC card 10 is divided into normal state and sleep state. Normal state is the state in which the high speed Ethernet PC card 10 operates for expected normal applications.

On the other hand, Sleep state is the state in which the high speed Ethernet PC card 10 is in standby condition, i.e. only minimum internal devices are maintained in active condition and all the other internal devices are temporarily shut down, thereby, the high speed Ethernet PC card 10 will not go on to perform the complete function of a network card. In the present embodiment, the sleep state is the state in which the operation of the auxiliary unit (the unshielded twisted pair wiring transceiver 14, and the high speed static memory 16) is temporarily turned off to stop performing the transceiving and accessing works, and only the high speed Ethernet controller 12 remains in idle condition.

Explained hereafter is the difference between the normal state and sleep state. In the normal state, as described previously, the high speed Ethernet PC card 10 is inserted in the computer 80, the socket 22 and plug 24 which support DnS function are appropriately connected while the RJ45 unshielded twisted pair wiring connector unit head 90 is connected to the networks, this is the state that the conventional network card provides normal service. As the the user of the computer 80 is leaving for somewhere, i.e. the computer 80 is carried along with someone to go somewhere else, all he has to do is to disconnect the plug 24 which supports DnS function, i.e. to disconnect it from the networks while the high speed Ethernet PC card 10 still remains inserted in the computer 80. Once the connector unit (the socket 22 and plug 24 which support DnS function) are disconnected, the Drag & sleep controller 20 receives a signal and generate and transmit an interrupt-signal to the high speed Ethernet controller 12. It then turns off the auxiliary unit (the unshielded twisted pair wiring transceiver 14 and the high speed static memory 16), thereby, the high speed Ethernet PC card 10 gets into sleep state.

As the user of the computer 80 moves to some other places and intends to be on-line again, he will have the connector units (the socket 22 and plug 24 which support DnS function) connected, and the Drag & sleep controller 20 will then generate and transmit an interrupt-signal to the high speed Ethernet controller 12, to turn on the auxiliary unit (the unshielded twisted pair wiring transceiver 14 and the high speed static memory 16), thereby, the high speed Ethernet PC card 10 will resume normal state to perform network communication.

In one the embodiment of the present invention, under the normal state, the consumption of electric current of the high speed Ethernet PC card 10 is 250 mA, while under the sleep state, the current consumption lowers to 50 mA which is one fifth of the original value, thereby, it is apparent that the effect of energy saving is superior.

What is particularly worthwhile to pay attention to is that the sleep state of the high speed Ethernet PC card 10 is not the same as that of the conventional network PC card in turn-off state. The conventional PC card will remain in normal operation state after completing the installation and set-up no matter whether or not it is connected to the external system (the external networks or devices), thereby, the energy consumption makes no much difference. But if it needs to save energy, the PC card must be removed in order to save energy, and it must be reinstalled and set up again when it is to be used again, especially, it would be a great blow for those users who often carry the portable notebook computer to work on, On the other hand, in order to attain the objective of saving energy, the present invention retains only the necessary internal devices to be in idle condition while temporarily turns off the other internal devices, in this way, it not only can attain the function of saving energy but also can eliminate the inconvenience of removing, reinstalling and setting up again the PC card.

Figure 2:
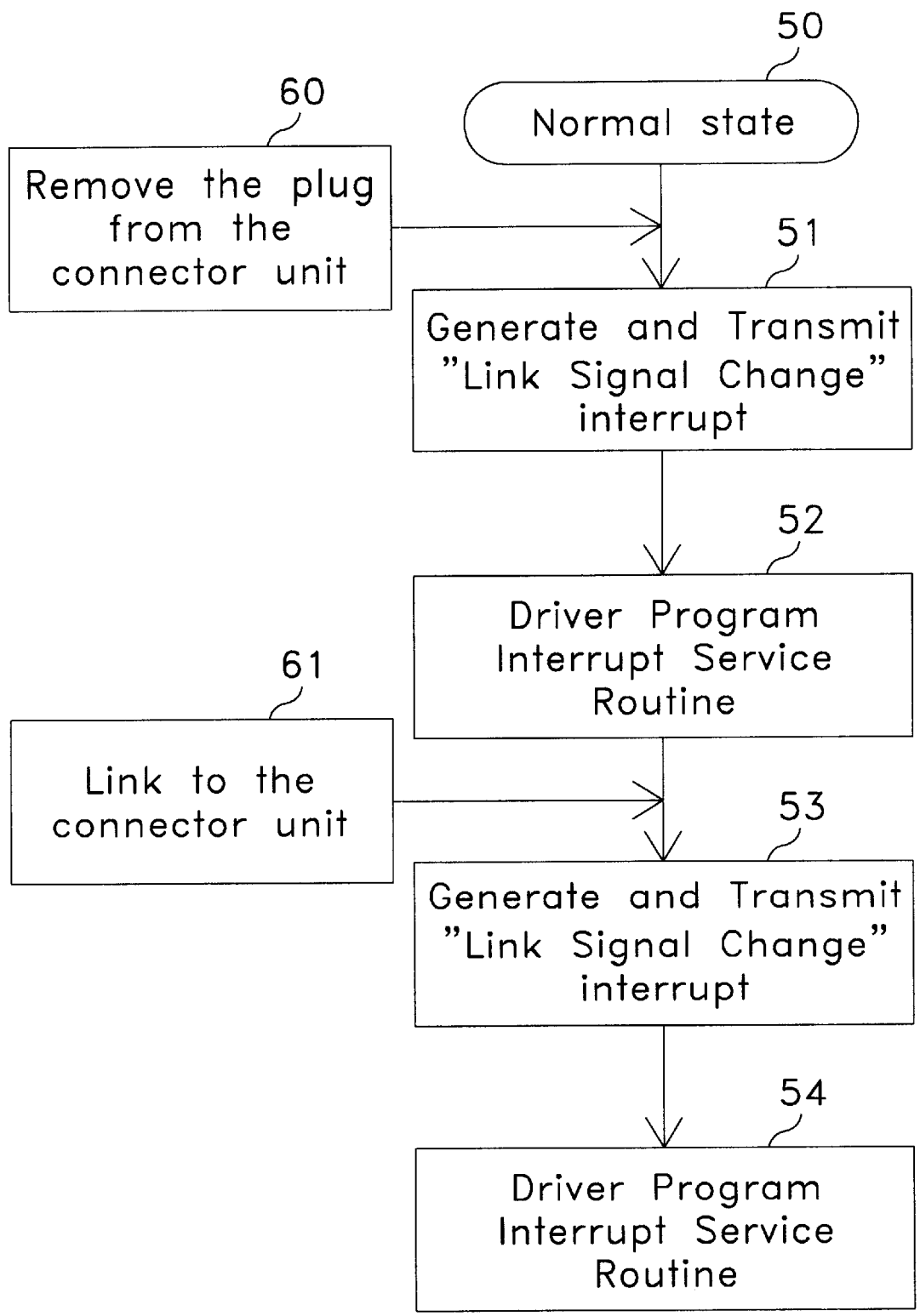
FIG. 2 is the operation flow chart of the embodiment as shown in FIG. 1 of the present invention.

Referring to FIG. 1 and FIG. 2, the detailed operation flow chart of the foregoing embodiments is illustrated as follows: Nonnal State 50:

While the computer 80 and the high speed Ethernet PC card 10 are both in service, the high speed Ethernet controller 12 is in normal state, and there is no apparent difference between the high speed Ethernet PC card 10 and the conventional PC card of the same kind.

Remove the Plug from the Connector Unit 60:

The user must cut off the connection between the computer 80 and the networks, i.e. cut off the connection between the socket 22 and plug 24 which support DnS function.

Generate and Transmit "Link Signal Change" Interrupt 51:

As the connector unit was unplugged in the previous step, the Drag & Sleep controller 20 will transmit an interrupt-signal to the high speed Ethernet controller 12 to notify that the link has been cut off as soon as the Drag & Sleep controller 20 receives the unplugged signal indicating that the connector was unplugged, thus the high speed Ethernet controller 12 will immediately stop the operating work temporarily to handle this interrupt.

Set the flag of the sleep state in the high speed Ethernet controller 12 as "1": In the mean time, there is a sleep state flag set up in the high speed Ethernet controller 12 which is set as "1" to indicate that the high speed Ethernet controller 12 has got into sleep state.

Driver Program Interrupt Service Routine 52:

It then goes on to drive the program interrupt service routine 52 in order to handle the interrupt command currently provided:

Check the sleep state flag: To make sure the set-up of the sleep state flag without fail.

Stop transceiving: The high speed Ethernet PC card 10 will not proceed with data transceiving any more, i.e. it temporarily stops the network communication.

Link to the Connector Unit 61:

When the user arrives some other areas and he intends to be on-line again, he can connect the socket 22 and plug 24 which support DnS function in order to connect the computer 80 to the networks.

Generate and Transmit "Link Signal Change" Interrupt 53:

The Drag and Sleep controlling circuit will generate and transmit an interrupt-signal to enable the high speed Ethernet controller 12 to perform network operation as soon as the connector unit is again connected.

Set the flag of the sleep state in the high speed Ethernet controller 12 as "0": Change the sleep state flag in the high speed Ethernet controller 12 into "0" to indicate that the high speed Ethernet controller 12 has resumed normal operation.

Driver Program Interrupt Service Routine 54:

To enable the high speed Ethernet PC card 10 to go on executing network communication, program interrupt service routine is driven in order to perform requisite work.

Check the Sleep State Flag:

To confirm the correctness of the set-up of the sleep state flag.

Resume Normal Operation:

Resume all the function of the device in the high speed Ethernet PC card 10, and the unshielded twisted pair wiring transceiver 14 of the high speed Ethernet networks also resumes data transceiving. At this time, the high speed Ethernet PC card 10 is returned to normal service state again.

It can be seen from the foregoing illustration that the feature of the embodiment is to use the Drag & Sleep control circuit 20 to enable the high speed Ethernet controller 12 to get into sleep state or resume normal state in accordance with the connector unit's connecting status, and to temporarily turn off, in the sleep state, the operation of unnecessary devices in the high speed Ethernet PC card 10 so as to lower the energy consumption of the high speed Ethernet PC card 10, thereby, to attain the objective of energy saving.

In another embodiment of the present invention, it is the computer system connected to the PC card that directly give commands to make PC card get into sleep state or resume normal state. The two statuses are not to be reiterated here since they are the same as the foregoing illustration.

Figure 3:
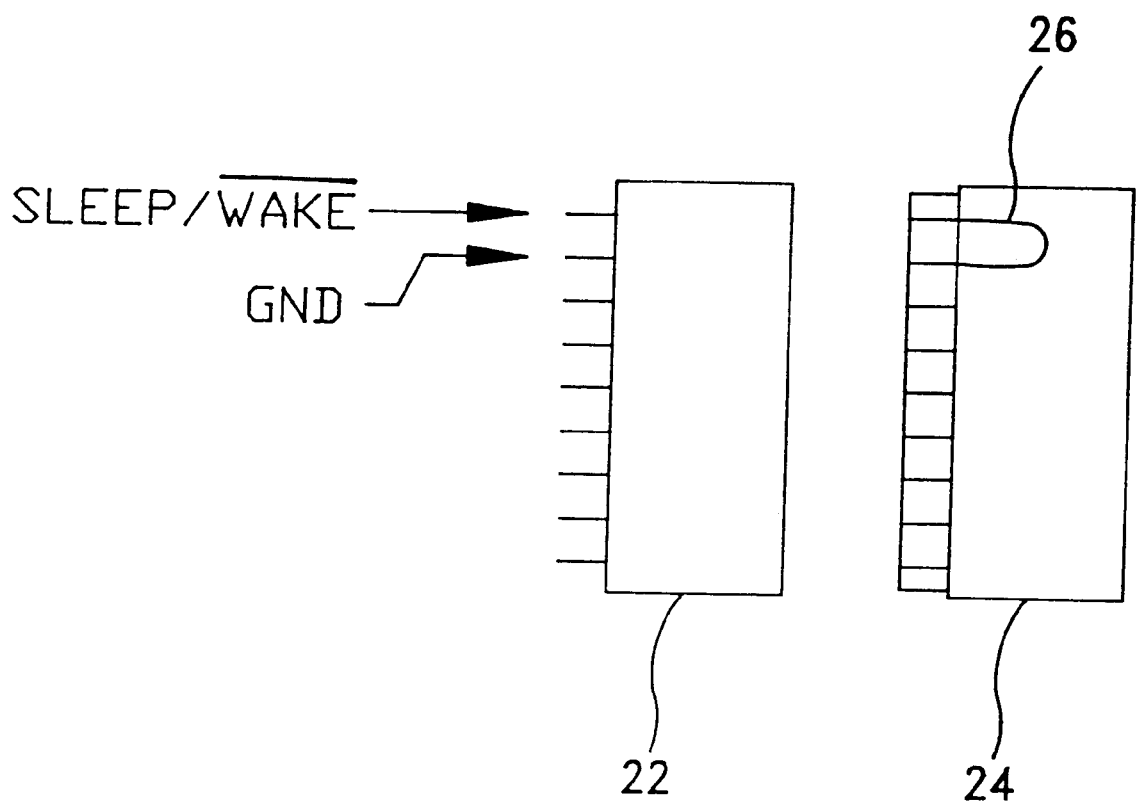
FIG. 3 shows an embodiment of the connector unit supporting the DnS function of the present invention.

FIG. 3 presents connector units supporting the DnS function. The connector unit comprises socket 22 and plug 24 matching each other, wherein socket 22 further comprises a contact for generating and transmitting SLEEP/WAKE signal in sleep state, as well as another contact connected to the ground terminal GND; moreover, there is an electric connection 26 between the plug 24 and the two pins corresponding to the two contacts SLEEP/WAKE and GND.

As the connector units are connected, i.e. when the plug 24 inserts in the socket 22, owing to the function of the electric connection 26, the contact of SLEEP/WAKE and contact GND have the same potential, thereby, the signal of the contact of SLEEP/WAKE is at zero-level, thereby, the PC card knows that the connector units are in normal connecting status and all operation is in normal state.

Figure 4:
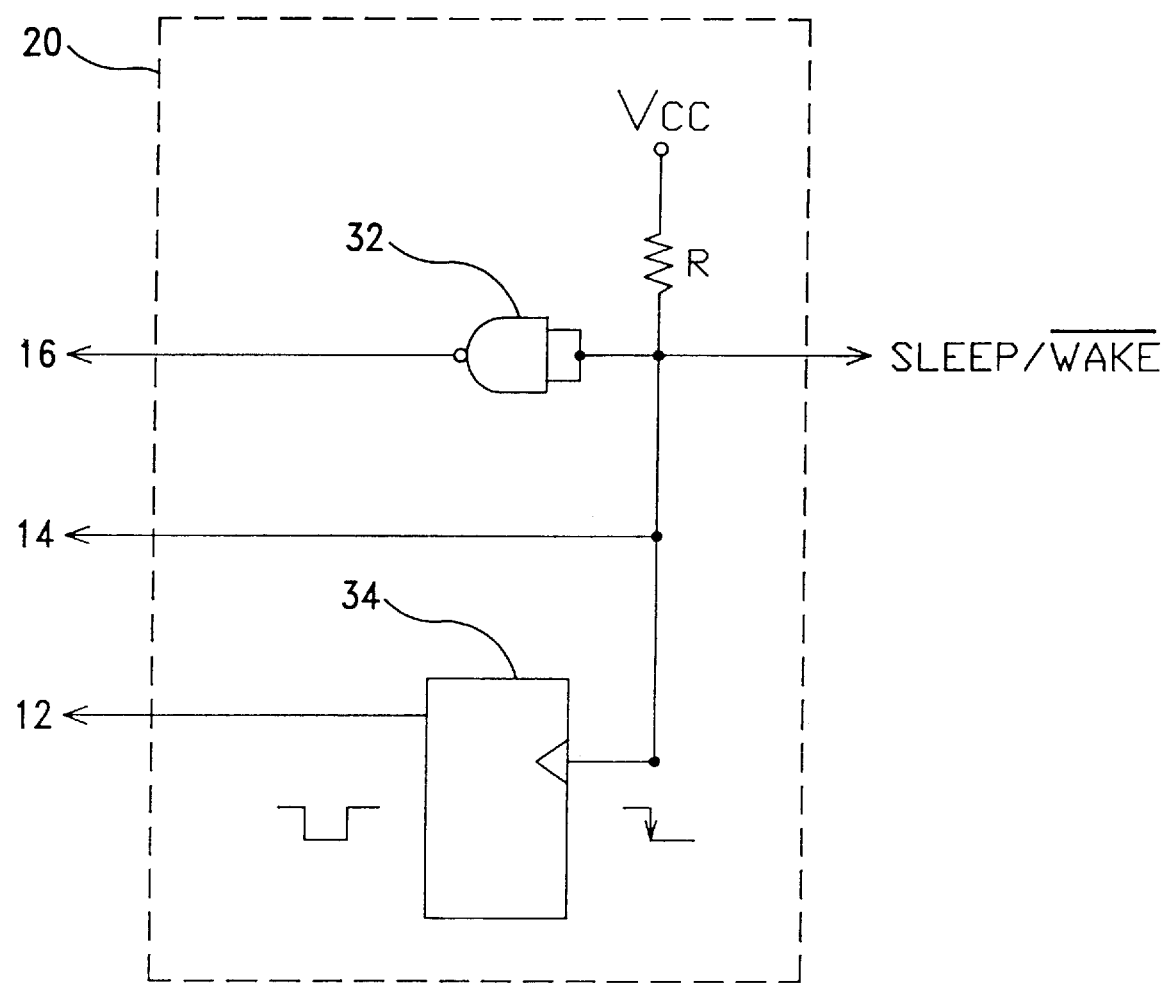
FIG. 4 shows an embodiment of the Drag & Sleep Control Circuit of the present invention.

FIG. 4 discloses a Drag & sleep controller 20 which makes use of a Pull High resistor R connected to a power source Vcc to provide signal state with power source; the input of the Drag & sleep controller 20 is the sleep state signal SLEEP/WAKE, which, for example, is the one connected to the contact of the sleep state signal SLEEP/WAKE of the socket 22 as shown in FIG. 3. The output of the Drag & sleep controller 20 comprises three signals which are sent to the high speed Ethernet controller 12, and the auxiliary unit (the unshielded twisted pair wiring transceiver 14 and the high speed static memory 16) respectively, wherein the signal generated and transmitted to the unshielded twisted pair wiring transceiver 14 is drawn from the input sleep state signal SLEEP/WAKE. As for the signal trammitted to the high speed static memory 16, it is a signal generated by inverting the sleep state signal SLEEP/WAKE through a NAND Gate. Lastly, the signal generated and transmitted to the high speed Ethernet controller 12 is a pulse signal generated by using the sleep state signal SLEEP/WAKE to trigger an One-shot Circuit.

Referring now to FIG. 3 and FIG. 4, as illustrated in the foregoing statement, when the connector unit is in normal connecting status, sleep state signal SLEEP/WAKE=0, and PC card is in normal state. But once the plug 24 is separated from the socket 22, state of contact SLEEP/WAKE becomes floating, the sleep state signal SLEEP/WAKE will be raised to Vcc level due to the effect of Vcc,. If the plug 24 is inserted in the socket 22, the sleep state signal SLEEP/WAKE will drop to zero-potential again. By means of the foregoing switching between the two states, the Drag & sleep controller 20 is driven to generate and transmit signal to the other devices of the PC card for changing the operation mode.

The operation of the detailed circuits constituting the Drag & Sleep Controller 20 is not to be illustrated here as it is obvious to those who are versed in the art.

The foregoing statements represent only the preferred embodiments of the present invention, the other feasible embodiments are the ones that are easily inferred by those who are versed in the art, for instance, installing switches in order to control PC card to get into sleep state or resume normal state,. or modifying the circuit details and ways of connection. Therefore, it should be appreciated that the present invention is in no way limited to the details of such embodiments, but is capable of numerous modification within the scope of the appended claims.

What is claimed is:

1. A PC card providing an automated Drag and Sleep function and a communication between a computer system and an external system comprising:

a controller controlling said communication between said computer system and said external system;

an interface connecting said controller to said computer system;

a connector unit which is manually controllable to connect said PC card to said external system, and to disconnect said PC card from said external system;

a Drag and Sleep control circuit connecting said controller and said connector unit; and an auxiliary unit which is controllable by said controller to turn on and turn off;

when said connector unit connects said controller to said external system said controller provides said communication between said computer system and said external system, and when said connector unit disconnects said controller from said external system, said Drag and Sleep control circuit generate and transmits an interrupt-signal to said controller to turn off said auxiliary unit while maintain said controller in an idle state, when said connector unit connects said controller again to said external system, said Drag and Sleep control circuit generates and transmits another interrupt-signal to said controller to turn on said auxiliary unit and to enable said controller to control said communication between said computer system and said external system.

2. A PC card as claimed in claim 1 wherein said connector unit comprises a set of plug and socket matching each other and said socket further comprises two contacts connected to said Drag and Sleep control circuit and a ground terminal respectively, moreover, said plug and the two corresponding leads of said two contacts are electrically connected.

3. A PC card as claimed in claim 1 wherein said connector unit generates a disconnecting status signal when said controller is not connected to said external system and said Drag and Sleep control circuit comprises an one-shot circuit which receives said disconnecting signal from said connector unit to generate and transmit an interrupt-signal in order to make said PC card get into said sleep state.

* * * * *